April 23, 1963

B. WALKER 3,086,605

VEHICLE LIFTING AND TRAVERSING DEVICE

Original Filed March 15, 1954

INVENTOR.
Brooks Walker

April 23, 1963 B. WALKER 3,086,605
VEHICLE LIFTING AND TRAVERSING DEVICE
Original Filed March 15, 1954 4 Sheets-Sheet 2

INVENTOR.
Brooks Walker

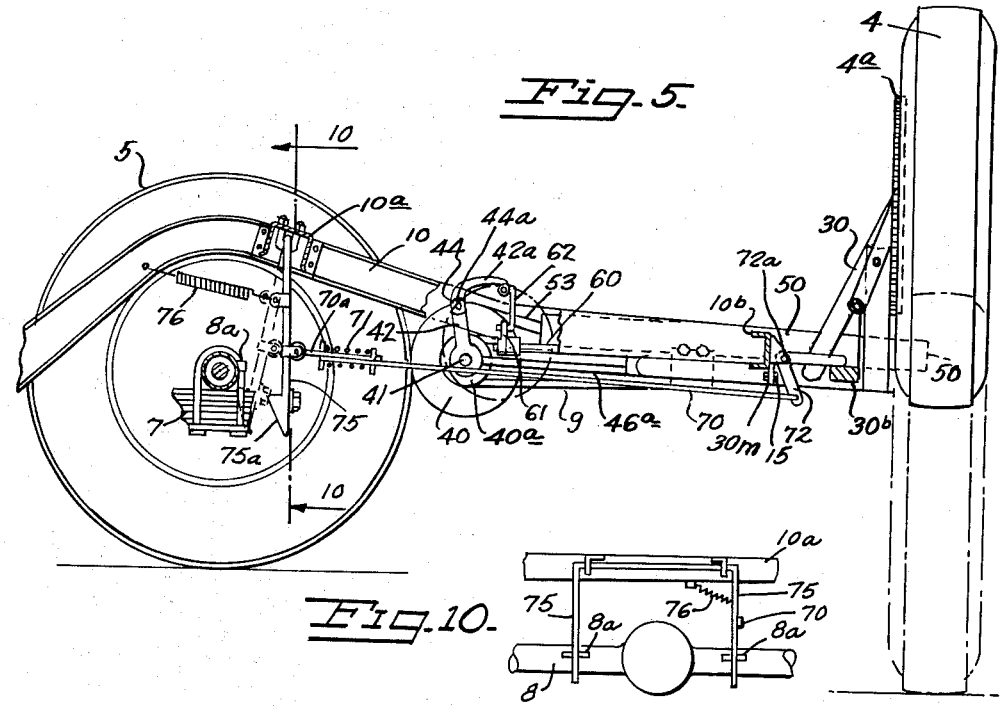

April 23, 1963  B. WALKER  3,086,605
VEHICLE LIFTING AND TRAVERSING DEVICE
Original Filed March 15, 1954  4 Sheets-Sheet 4
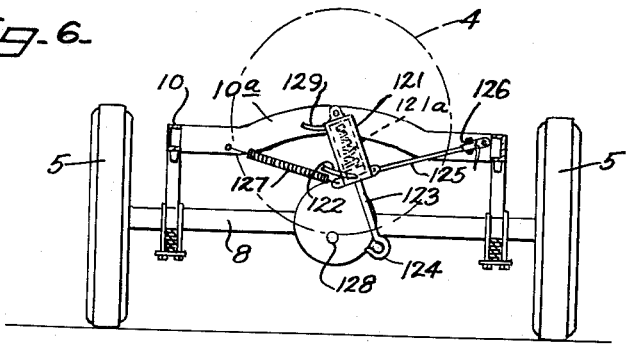
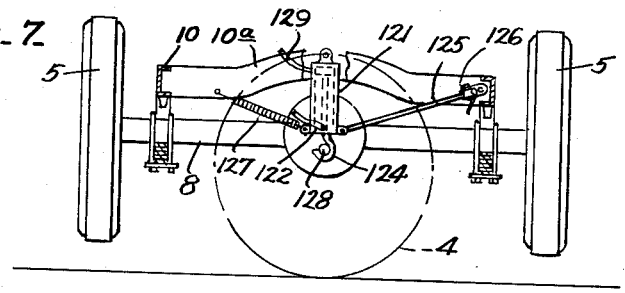
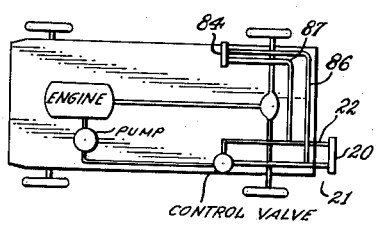
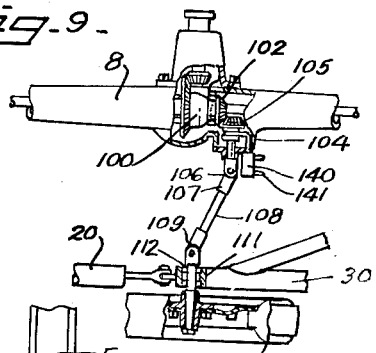
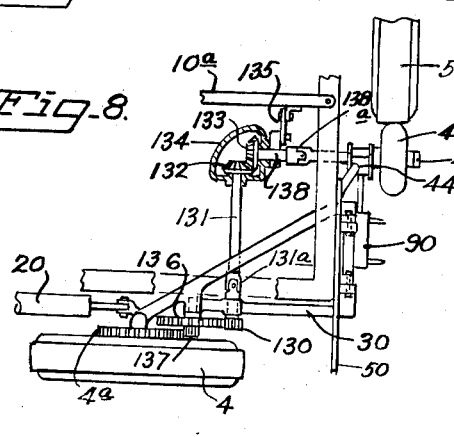
INVENTOR.
Brooks Walker

United States Patent Office 3,086,605
Patented Apr. 23, 1963

3,086,605
VEHICLE LIFTING AND TRAVERSING DEVICE
Brooks Walker, 155 Montgomery St., San Francisco 4, Calif.
Continuation of abandoned application Ser. No. 416,156, Mar. 15, 1954. This application Feb. 17, 1959, Ser. No. 793,929
11 Claims. (Cl. 180—1)

This invention pertains to vehicle lifting and traversing devices of the general type covered by my issued U.S. Patent No. 2,136,570, wherein the transversely mounted spare wheel or other suitable transversely mounted ground-engageable element is lowered by engine power and raises the wheels at one end of the vehicle. A drive from one of the rear wheels or the drive mechanism to the rear wheels rotates the then ground-engaging wheel to swing the elevated end of the vehicle to the right, or to the left by normal forward and reverse vehicle transmission control, and the swing or rotation of the vehicle about a pivot at the worward end of the vehicle is checked or stopped by the use of the regular wheel or drive-shaft brake. The rear wheels are elevated from the roadway, and one of them which is not held by the brake rotates in driving connection with the spare wheel as the car is being moved sideways.

This application is a continuation of application Serial No. 416,156, filed March 15, 1954, and since abandoned.

One important improvement in this invention over the prior art arises in a novel way of driving the spare wheel from one of the rear wheels while setting the service brake on the other rear wheel, or otherwise automatically stopping one rear wheel and having enough gear reduction in the drive to the spare wheel so that the rear of the car will swing to the right or to the left much slower than it would go forward or backward in the same gears and same engine speed. This allows more control in swinging and requires less friction on the drive from one rear tire than if a drive such as shown in my U.S. Patent No. 1,990,150 were used.

Another object of the invention is to provide a drive from the ground-contacting surface of one of the rear tires to drive the spare wheel, for the rubber of the tire tread is better suited for driving a power-takeoff roller than is the rubber on the side of the tire, which was used heretofore. If the drive is taken at a surface lying on the diameter of a roller and taken from the ground-contacting surfaces of the elevated rear tire with an axis of rotation of the roller parallel to the rear wheel axle, there will be less slippage and abrasion of the rubber on the roller and rear tire than where the axis of rotation of the roller lies at a substantial angle to the axle of rotation of the vehicle wheel against which it bears for driving contact.

Another object is to provide a crutch that can readily plug into the mechanism that supports the spare tire, so that the crutch contacts the ground and lifts the spare tire off the ground. This can be used for changing a tire and will act as a jack without requiring the use of the wheel bolts, as were required in my U.S. Patent No. 1,990,150, see FIGS. 5 and 5a.

A further object of the invention is to provide hydraulic means for stopping or setting the brake on the rear wheel not doing the driving, so that oeprator-controlled driving control will be provided from the vehicle-lifting hydraulic system as soon as there is hydraulic pressure exerted to lift one end of the vehicle on the spare wheel; otherwise, the rear of the car might start rolling sideways on a side slope, if the drive to the rear wheel or drive shaft were not connected firmly to the spare wheel until the rear of the car was almost fully lifted on the spare wheel.

Another object is to provide axle hooks near the center of the axle for lifting the rear axle, to prevent the hooks from missing the axle when the vehicle is on a warped roadway. This control axle hooking still provides a stable, axle-to-frame relation when lifted, in order to get a positive drive from the elevated rear wheel to the spare wheel driving wheel.

Another feature of the invention is to provide a drive from a secondary gear on the rotating differential cluster housing, with a diameter much smaller than the ring gear. A power takeoff can be easily installed or provided and thus furnish a drive from this takeoff wherein the drive shaft to the spare wheel will rotate at about the speed of rotation of the differential ring gear. This drive shaft to the spare wheel could be connected directly to the spare wheel axle or to a gear reduction to the spare wheel hub.

Another object of the invention is to provide a way in which after the ground-contacting element is lowered to ground contact, the vehicle rear wheels are moved closer to the vehicle body to create a clearance between the rear vehicle wheels and the roadway. In this invention the vehicle body is not moved up as much as the vehicle wheels are moved up when getting the rear wheels off the ground.

Another object is to improve the drive from the rear tire tread to the spare wheel either by bevel gears and shafts, or by belts turning corners to eliminate bevel gears. The belts have idlers moving with the driven wheel, which moves toward and away from the vehicle rear wheel for engagement or disengagement with the rear wheel. The idlers thereby keep the belts in substantial adjustment during said fore and aft motion of the small driven wheel.

Another object is to provide manual means for rendering the actuation of the rear-tire-contacting wheel inoperative during the lifting operation, so that the rear tire can be removed easily when raised on the spare-tire-supporting mechanism for tire change, mounting chains, repair work, etc.

Another object is to provide means for rendering inactive the setting of the brake or mechanism for stopping that rear tire which is not driving the spare tire, to enable rotation of said rear wheel when elevated, to facilitate tire change, installation of tire chains, etc.

Another, and one of the main, objects is to provide a design that can be attached to automobiles of current design with substantially no body or chassis changes except those common to continental mounts, and to utilize power steering fluid pressure to actuate the raising and lowering of the lifting and traversing device.

Another feature is to provide a movable mount for a spare tire mounted partially on bumper-extensions for the vehicle.

Another feature is to provide a support for a spare wheel pivoted to one rear bumper-extension, and an operating cylinder pivoted to the other rear bumper-extension, for easy installation.

Other features of the invention will be more particularly pointed out in the accompanying specifications and claims.

I have illustrated my invention by way of example in the accompanying drawings, in which:

FIG. 4 is a top plan view on a reduced scale of a portion of the rear of a vehicle partly cut away and showing another form of the invention.

FIG. 5 is a view in side elevation and in section of a portion of the rear of a vehicle, showing the form of the invention illustrated in FIGS. 1, 2, and 3, the section being taken along the line 5—5 of FIG. 3.

FIG. 6 is a view in rear elevation and in section on a reduced scale, taken from slightly behind the rear axle and showing another form of the invention, with the spare wheel raised.

FIG. 7 is a view similar to FIG. 6 with the mechanism in the rear wheel elevated position.

FIG. 8 is a plan view, partly cut away, of a rear corner of a vehicle showing another form of the invention.

FIG. 9 is a plan view, largely cut away, showing another form of the invention.

FIG. 10 is a cut away view in section taken along the line 10—10 in FIG. 5, showing a portion of the vehicle.

FIG. 12 is a schematic showing of a conventional four-wheeled engine driven vehicle with a hydraulic pump and ducts leading therefrom to the hydraulic devices used for controlling the spare wheel and the rear wheel holding means.

In all figures like numerals of reference refer to corresponding parts.

Figure 1:
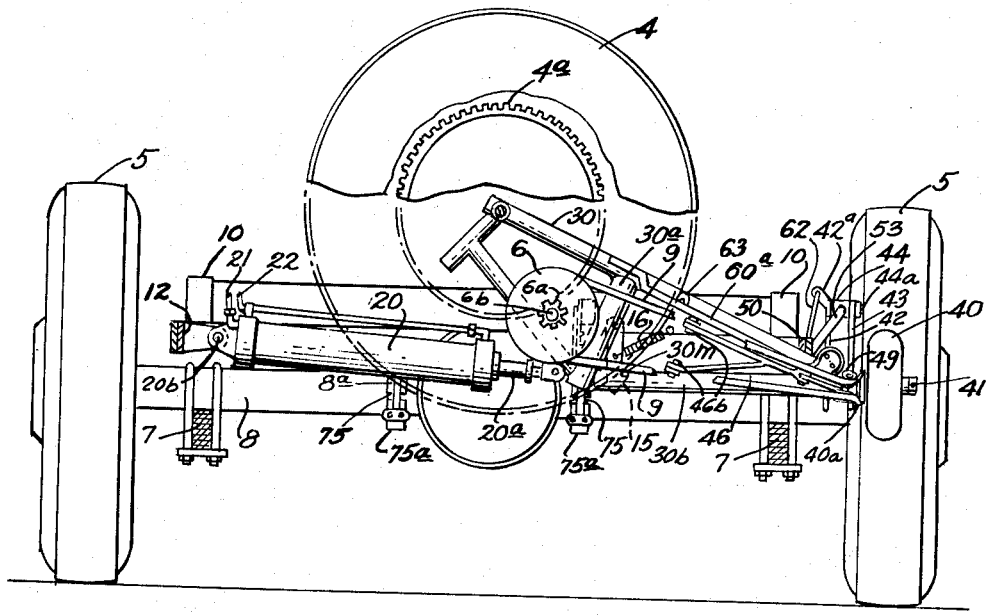
FIG. 1 is a view in rear elevation and partly in section taken inside the spare tire at the rear of a vehicle at section 1—1 of FIG. 3, showing one form of the invention, with the spare tire elevated.
Figure 2:
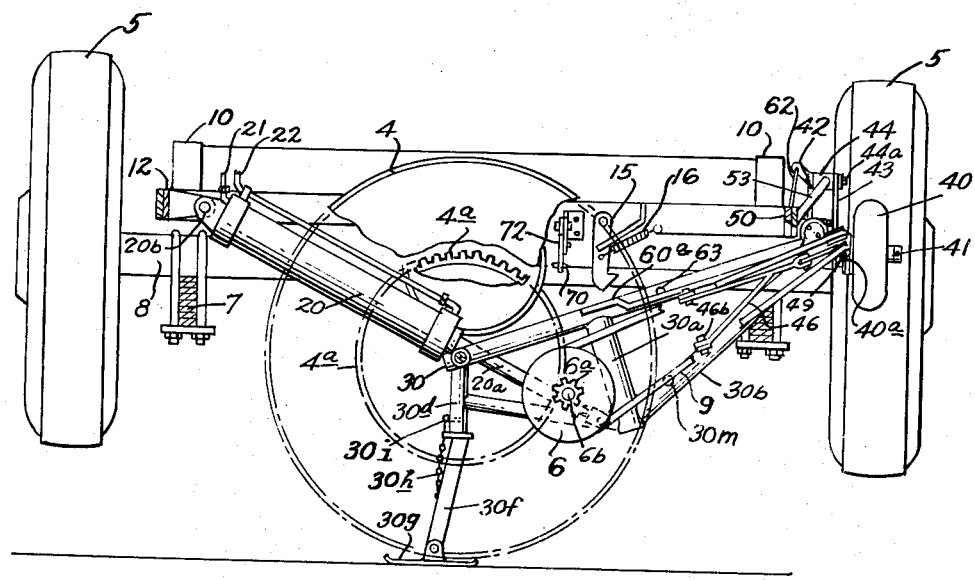
FIG. 2 is similar to FIG. 1, but showing the mechanism in the position to elevate the rear vehicle wheels.

In FIGS. 1, 2, 3, and 5, I have shown a vehicle frame 10, rear axle 8, springs 7, rear wheels 5, and spare wheel 4. The spare wheel 4 is movably mounted on a frame 30 which is pivoted in bearings 51 and 52 that are secured to a bumper extension 50 attached to the side member of the frame 10. The frame 30 is braced by a diagonal member 30b and the frame 30 together with the spare wheel 4 constitute the lifting and traversing device for the vehicle.

A hydraulic cylinder 20, which is actuated by engine-driven hydraulic power, as shown in my cited U.S. Patents 1,990,150 and 2,136,570 and application Serial No. 343,110, now abandoned, is employed to raise the car on the spare wheel 4 by means of fluid entering line 21, while fluid pressure on a line 22 is used to retract the spare wheel 4 to the inactive position shown in FIG. 1. The end of the piston rod 20a associated with the hydraulic cylinder 20 is connected to the frame 30 near the lower end of a brace 30a. The other end of the cylinder 20 is pivoted at 20b to a bumper extension 12.

All the mechanism for mounting the spare wheel frame 30 and the drive for the spare wheel 4 is mounted on the other bumper extension 50 to facilitate installation and reduce costs. A small wheel 40 is rotatably mounted on an axle 41 to which is secured a V-pulley 40a. The V-pulley drives a V-belt 9 entrained over idler pulleys 49 supported on an A-frame 46. The A-frame 46 is pivoted to the spare wheel frame 30 by pivot pins 46b. One end of a rod 46a is pivoted around the axle 41, and the other end is pivoted to the A-frame 46. Idlers 49 are set at an angle to each other to align the belt 9 leading from said idlers to a larger drive pulley 6 attached to a small gear 6a, which is rotatably supported on the frame 30 by a shaft 6b mounted on the frame 30. The gear 6a meshes with a gear 4a, which is secured to an extension of the spare hub 4b; so the spare wheel 4 can be removed in the usual manner for tire change.

The axle 41 is hung from two bars 42 and 43, which are pivoted above the axle 41 in a bearing 44 mounted on a rigid bracket 53 of the bumper extension 50. The bar 42 has an extension 42a which makes a bell crank with the bar 42 about a pivot shaft 44a, and this extension 42a is connected to a crank 61 by a link 62 (see FIGS. 1 and 2). The link 62 is connected to a torsion bar 60. The extension 42a rotates about the shaft 44a in the housing 44, while the crank 61 rotates with the torsion bar 60 at right angles to the shaft 44a. The torsion bar 60 has a rear crank arm 60a. The arm 60a is normally engaged to the under side of a lug 63 attached to the spare wheel mounting frame 30; so the torsion bar 60 rotates with the frame 30 to rotate the crank 61. The crank 61 pulls down on the link 62 and bell crank 42a to move the axle 41 to where the wheel 40 is into contact with the rear tire tread as the spare wheel 4 is lowered and, after contact, increases the pressure to a satisfactory yielding driving pressure between the wheel 40 and the rear tire 5, due to the spring action in the torsion bar 60.

The rear axle 8 is engaged during the lowering of the spare tire by the action of a bell crank 72, which is pivoted to a frame cross member 10b at a pivot point 72a. The bell crank 72 engages the frame 30b when the frame 30b is in the raised position shown in FIGS. 1 and 5, to hold hooks 75 retracted. This construction allows a link 70 to move forward as soon as the spare wheel 4 and frame 30b move down, so that hooks 75a engage lugs 8a on the axle 8. A spring 76 urges the double hook arms 75 forward so that the hooks 75a can engage the lugs 8a on the rear axle 8 to lift the axle 8 with the body.

A spring compresses between link elements 70 and 70a to prevent damage to the link 70, the bell crank 72, and their associated pivots, brackets, lugs and other parts in case the axle 8 is hanging on the arms 75 when the wheel 4 is raised and pulls link 70 back. The power of the cylinder 20 and the weight of the axle 8 and the pressure of the suspension means between the axle 8 and the frame 10 are too great for disengagement of the hooks 75a in certain rare instances, such as when the rear of the vehicle is raised on a frame jack after the vehicle has been previously raised on the spare wheel, and then the spare wheel 4 has later been raised or retracted to its FIG. 1 position. Thus the spring 71 is necessary when after the spare tire 4 is in the position shown in FIG. 2 and the car is lifted on a hoist or jack and the spare wheel is then retracted to its FIG. 1 position, because under those circumstances the hooks 75a cannot be retracted, and the link 70 and bell crank 72 might be bent.

Figure 3:
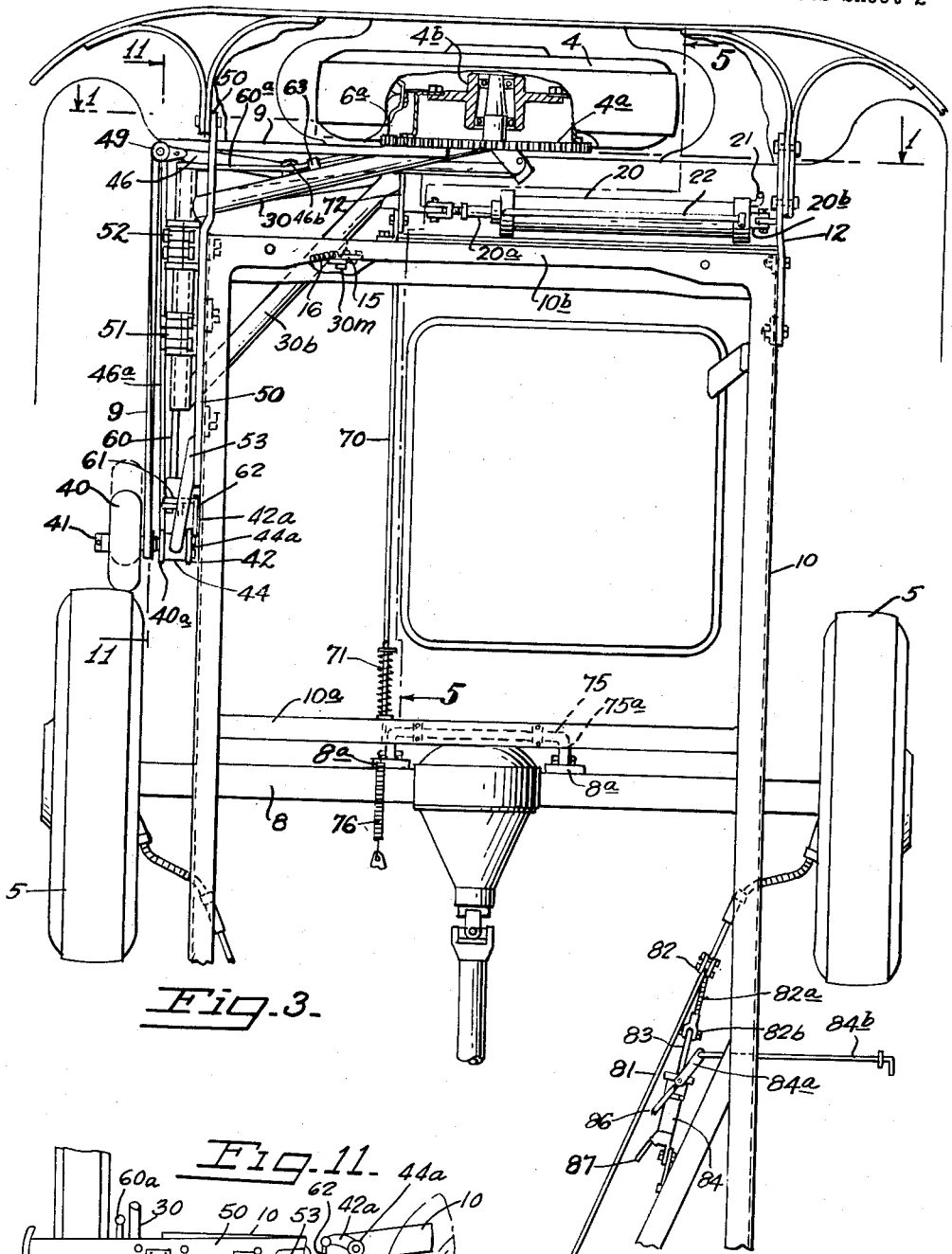
FIG. 3 is a top plan view, partly cut away, of the invention shown in FIG. 1 and FIG. 2.
Figure 11:
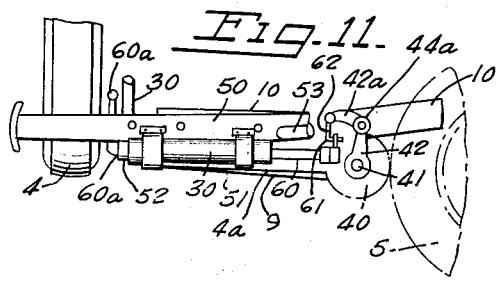
FIG. 11 is a view in side elevation and in section of the rear portion of the vehicle taken along the line 11—11 of FIG. 3.

The rear wheel 5 at the right as viewed in FIG. 3 is stopped from rotation as the vehicle is lifted on the spare wheel 4 by a cylinder 84 (FIG. 3) pulling on a brake cable 81 through its piston rod 83 and a link 82a to a clamp 82. Fluid in a line 86, which causes the piston rod 83 to retract, is connected to fluid in the line 21 that controls the lift of the car; so the brake on the rear wheel 5 at the right of FIG. 3 is set as soon as the car starts to lift. A line 87 is connected to line 22 and carries fluid which extends the piston rod 83 so that the cable 82a will be slack and will not interfere with the brake when the spare wheel 4 is retracted. In case it is desired to remove or work on this rear wheel 5 when it is elevated on the spare mechanism 30, a link 84a is pivoted to the cylinder 84 and actuated by a rod 84b so that a lug on the link 84a engages a shackle 82b on the rod 83 to intercept the end of piston rod 83 before lifting on the spare wheel 4, to allow free rotation of this wheel 5.

When this is done, the spare wheel 4 should be blocked as no drive or brake control will exist without the braking of this wheel. The vehicle is lifted on a crutch 30f, which is plugged into an arm 30d and retained and located by a pin 30i which, in turn, is fastened to the crutch 30f by a chain 30h. A hinged base 30g may be necessary for ground contact. The crutch 30f is only used when it is desired to remove the spare tire 4 or to rotate it without swinging the car. A hold up hook 15 is normally caused by a spring 16 to engage a roller 30m on the frame 30, but the spring 16 is readily overcome by the cylinder 20 and the frame 30 is then pushed beyond the hook 15 for lowering under pressure.

In FIG. 4 I have shown another method of moving the small wheel 40 into contact with the rear wheel 5. A hydraulic cylinder 90 has its piston rod 95 attached near the axle 41, and the other end of the cylinder 90 is pivoted to a bracket 50a of the bumper-extension 50. A line 91 is connected to the line 21; so lifting pressure will move the wheel 40 into contact with the wheel 5 by pivoting on arms 45 and 45a about the bearing housing 44 on the bracket 53 of the bumper-extension 50 during the lifting operation. The wheel 40 is retracted when the spare wheel 4 is retracted, as a line 92 is connected to the line 22; so fluid pressure acting in the lines 92 and 22 retracts the spare wheel 4 and the wheel 40. The other rear wheel 5 is locked by a brake shoe 98 through action of the cylinder 95 (both mounted on the bumper-extension 12), by the line 91 being connected to the line 21. A lock link 96 is actuated by a hand control 97 to prevent the shoe 98 from engaging the wheel 5 when its tire is to be changed, etc.

In FIGS. 6 and 7 I have shown a hydraulic cylinder 121 pivoted at its top to the cross member 10a of the frame 10.

A spring 127 urges the cylinder 121 toward a boss 128 at the center of the rear axle 8; so a hook 124 on the end of a piston rod 123 will engage the boss 128 when the spare wheel 4 starts down. A cable 125 goes around a pulley 126 and goes to the bell crank 72, which slacks the cable 125 when the spare wheel 4 starts down and tightens the cable 125 as the spare wheel 4 reaches its inactive position. A line 122 is connected to the line 21; so lifting pressure will lift the rear axle 8 after the spare wheel 4 contacts the ground. Therefore, the rear of the vehicle will not have to be raised as much with this construction to get a given ground-to-rear-tire clearance.

The piston in the cylinder 121 may be pushed down either by a spring 121a or by hydraulic pressure in a line 129, which is connected to the line 22. Hydraulic pressure in the line 122 will retract the hook 124. This last hydraulic connection of a two-way hydraulic cylinder does not take as much oil as the single hydraulic acting piston would take from the power steering reservoir, if the power steering pump is used for raising and lowering the spare wheel 4. FIG. 6 shows the cylinder 121 in the inactive position, and FIG. 7 shows the cylinder 121 lifting the axle 8 for rear wheel road clearance when the rear of the vehicle is supported on the spare wheel 4. The action of the springs between the rear axle 8 and the frame 10 is transmitted hydraulically to the support of the car on the spare wheel 4 by this construction.

In FIG. 8 I have shown an alternate drive for the spare wheel 4, wherein the wheel 40 and axle 41 drive an axle 138 through a universal 138a, a bevel gear 133, and a bevel gear 132 in a box 134. The gear 132 drives shaft 131, a universal 131a, a gear 130, a larger gear 136, a small gear 137, and the spare wheel ring gear 4a. The cylinder 90 swings the wheel 40 into or out of contact with the rear tire 5 as the spare wheel 4 is lowered or raised respectively, in a manner similar to that shown in FIG. 4 except that some of the bearings that support the wheel 40 must be universal to allow some swing of the axle 41 during action of the cylinder 90. The gear box 134 is supported for swinging motion on a link 135 attached at one end to a gear box 134 and at the other to the cross member 10a. This eliminates the cost of a spline on the shaft 131. This drive eliminates the belts shown in FIGS. 1, 2, and 3, and may be more positive.

In FIG. 9 I have shown another drive in which a bevel gear 102 is mounted on the spline end of a rotating differential gear housing 100 outside its right hand bearing. A cover 104 provides a power take-off and mounts a bevel gear 105. A cylinder 140 actuates the bevel gear 105 into engagement when lifting pressure in the line 21 acts on a line 141 to shift the gear 105 into mesh with the gear 102 or engages a jaw clutch between the gear 105 and universal 106. A spline 107 drives a shaft 108, a universal 109, and the spare wheel 4 through an axle 112 which is bearinged at 111 to the movable spare-tire-support frame 30. This construction would require a tunnel in the luggage compartment for the shaft 108 in the spare wheel 4 raised position. The shaft 108 could be connected to a small gear (similar to the gear 137 of FIG. 8) at the bottom of the ring gear 4a to stay under the luggage floor. This provides a very simple positive spare tire drive from a power takeoff as far back on the vehicle as practical with a resulting short low speed drive shaft 108. Possibly the shaft 108 turns at spare wheel rotating speed like a rear axle to provide equal speed in swinging the rear of the car to the right or left as when moving forward or backward in the same transmission shifts with the same engine speed.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In an automotive vehicle having a frame supported on front and rear wheels, a lifting and traversing device incorporating a spare wheel adjacent to and rearward of said rear wheels, an engine on said frame, propelling means for the vehicle including a differential and said rear wheels and connectable to the engine for propelling the vehicle, an engine-driven hydraulic pump, hydraulic means operated by said pump for lowering said lifting and traversing device relative to said frame to place said spare wheel in contact with the roadway so as to lift the rear end of said vehicle on said spare wheel, and for raising said spare wheel relative to said frame so as to lower said vehicle and lift said spare wheel out of contact with said roadway, means on the vehicle establishing an operative connection of said spare wheel with the propelling means before said vehicle is lifted on said spare wheel and for driving said spare wheel after it is in contact with said roadway, the improvement comprising separate hydraulic means operated by said pump simultaneously with the first mentioned hydraulic means for holding at least one rear wheel against movement when said spare wheel is in firm contact with said roadway and before said vehicle is lifted, said means for holding being provided with manual release means so that the rear wheel may turn when it is being changed and replaced with said spare wheel without disassembly of said holding means.

2. In an automotive vehicle as defined by claim 1 in which the means for establishing an operative connection of the spare wheel with the propelling means comprises a driving connection between said spare wheel and said differential.

3. In an automotive vehicle as defined by claim 1 in which said rear wheel holding means includes friction means placed directly in contact with the normally ground-engaging surface of said rear wheel.

4. In an automotive vehicle as defined by claim 3 in which said friction means comprises a member pivotally mounted with respect to said frame, and a hydraulic cylinder supported on said frame and having a piston rod adapted to swing said member toward said rear wheel.

5. In an automotive vehicle as defined by claim 1 in which the means for establishing an operative connection of the spare wheel with said propelling means comprises a roller to the rear of said rear wheels, means for engaging said roller with the normally ground-contacting surface of the other rear wheel, when the latter is lifted above the roadway, and transmission means between said roller and said spare wheel.

6. In an automotive vehicle as defined by claim 5 in which said transmission means comprises bevel gears.

7. In an automotive vehicle as defined by claim 5 in which said transmission means comprises a V-belt with pulleys traveling in two planes at substantial right angles to each other, and gear-reduction means.

8. In an automotive vehicle as defined by claim 5 in which the transmission means includes a flexible belt, a first pulley rotating in the same plane with one of said rear wheels and driving said belt, and a second pulley at right angles to said first pulley driven by said belt in a plane parallel with the spare wheel.

9. In an automotive vehicle as defined by claim 1 in which the differential comprises a ring gear for driving said rear wheels; a rotating mounting for said rear gear; and the means for establishing an operative connection of the spare wheel with the propelling means includes a driving connection between said ring gear and a smaller gear mounted on said rotating mounting and a third gear engaging said smaller gear and mounted on a shaft extending rearwardly from the axis of said rear wheels and connected to said spare tire.

10. In an automotive vehicle as defined by claim 9 in which said shaft turns at a ratio of not over two to one relative to said ring gear.

11. In an automotive vehicle as defined in claim 1 in which the means for establishing an operative connection of the spare wheel with said propelling means comprises a roller to the rear of said other rear wheel engaging the normally ground-contacting surface of that said rear wheel.

References Cited in the file of this patent

UNITED STATES PATENTS

| | | |
|---|---|---|
| 674,666 | Blevney | May 21, 1901 |
| 1,387,626 | Swanson | Aug. 16, 1921 |
| 1,888,149 | Truran | Nov. 15, 1932 |
| 1,990,150 | Walker | Feb. 5, 1935 |
| 2,455,133 | Moffat | Nov. 30, 1948 |
| 2,692,143 | Rando | Oct. 19, 1954 |
| 2,808,271 | Devenne | Oct. 1, 1957 |

OTHER REFERENCES

Pamphlet: "The Fifth Wheel," received April 20, 1953.